United States Patent [19]

Troder

[11] Patent Number: 4,724,282

[45] Date of Patent: Feb. 9, 1988

[54] ELECTRICAL BOX

[75] Inventor: Walter P. Troder, Bryan, Ohio

[73] Assignee: Allied Moulded Products, Inc., Bryan, Ohio

[21] Appl. No.: 743,109

[22] Filed: Jun. 10, 1985

[51] Int. Cl.$^4$ .............................................. H02G 3/08
[52] U.S. Cl. .................................. 174/65 R; 439/449
[58] Field of Search .............................. 174/65 R, 53; 339/103 R, 103 M; 220/3.2–3.94; 439/449

[56] References Cited

U.S. PATENT DOCUMENTS 4,306,109  12/1981  Nattel ........................ 174/65 R X
4,316,999   2/1982  Nattel ........................ 339/103 R X

*Primary Examiner*—Arthur T. Grimley
*Assistant Examiner*—David A. Tone
*Attorney, Agent, or Firm*—Lundy and Walker

[57] ABSTRACT

An electrical box including an enclosure. The enclosure has a peripheral wall and a bottom. The peripheral wall has a first plurality of openings. The bottom has a second plurality of upstanding retainers adjacent the openings. A third plurality of wedge elements are disposed between the retainers and the peripheral wall adjacent the openings. The wedge elements are resiliently deflectable by insertion of electrical cables through the respective openings whereby insertion of the electrical cables wedges the electrical cables between the wedge elements and the peripheral wall.

17 Claims, 3 Drawing Figures

ELECTRICAL BOX

BACKGROUND AND BRIEF DESCRIPTION OF THE INVENTION

The invention relates to electrical boxes and more particularly to electrical boxes including clamping devices used for anchoring or clamping electrical cables to the electrical boxes.

Various electrical boxes have been utilized which provide some means for securing an electrical cable to the box so as to prevent inadvertent disconnection or disengagement of the cable from the box. Various electrical codes and standards have been applied to these electrical boxes. Recently, new requirements have been suggested for nonmetallic outlet boxes and certain electrical cables. These new requirements are concerned with securing electrical cables to the box such that the cables cannot readily be unintentionally removed. The following is representative of these requirements:

"25. Clamps for Nonmetallic-Sheathed Cable 25.1 A nonmetallic-sheathed-cable clamp shall secure the cable so that it will withstand for 5 minutes a direct pull of 60 pounds (267 N) without (1) damage to the insulation, (2) displacement of more than ⅛ inch (3.2 mm), or (3) loosening so that the cable can be readily removed by bending or flexing when the force is removed. The pull shall be applied between the cable and a box in which the clamp is mounted in the intended manner.

25.2 In preparing the sample for the test described in paragraph 25.1, the cut end of the cable sheath is to be in contact with the stop, if one is provided; if no stop is provided, the cut end of the sheath is to extend approximately ¼ inch (6.4 mm) beyond the clamp. The wires of the cable are to be allowed to project approximately 6 inches (152 mm) inside the box. Nonmetallic sheathed cable with a plastic outer jacket, or impregnated outer braid, is to be used in conducting the secureness test on a clamp for use with a No. 14 AWG (2.1 mm$^2$) 2-wire cable. The cable is to have a minor axis of 0.210–0.285 inch (5.33–7.24 mm) and a major axis of 0.390–0.470 inch (9.91–11.94 mm). A screw that can be tightened with a screwdriver is to be tightened as specified in paragraph 8.5. See paragraph 77.10." UL 514C 25 (1981).

Various methods heretofore have been used to secure electrical cable in accordance with the above requirements. Some of the boxes use clamps retained by screws within the box to grip electrical cables inserted through box openings. These electrical boxes have the shortcoming that installation is relatively cumbersome and tightening the clamps requires use of a screwdriver in the small confines of an electrical box.

Another variety of electrical box eliminates the screws and instead uses wedges which must be forced into place after the electrical cable is inserted into the box. These wedges are also difficult to manipulate within the confines of the box. In addition, provisions must be made in distributing and selling the boxes for either packaging the wedges such that they remain with the rest of the box or for providing for the separate distribution of both boxes and wedges.

Another variety of electrical box utilizes a clamp attached to the box by a relatively pliant neck. In this variety of box, the neck is bent, the electrical cable is inserted into the box, and the clamp is then set by pressing it against the cable. Like other electrical boxes, this box has the shortcoming that the clamp must be manipulated within the box to secure the cable.

It is therefore highly desirable to provide an improved electrical box. It is also highly desirable to provide an improved electrical box which retains electrical cables without the use of screws. It is also highly desirable to provide an improved electrical box in which clamps or wedges do not have to be tightened or set. It is further highly desirable to provide an improved electrical box by which electrical cables can be retained therein totally from the exterior of the box and without manipulation within the box. It is further highly desirable to provide an improved electrical box which may be shipped without the fear of loss or special packaging or distribution of the wedges or clamps.

It is still further highly desirable to provide an improved electrical box which is easy to use and which presents little risk of damage to the electrical cable and the electrical box.

It would finally be highly desirable to provide an improved electrical box which meets all of the above-desired features.

It is a feature of the improved electrical box of the invention to retain electrical cables without the use of screws or other small fasteners by means of resiliently deflectable or deformable wedge elements and upstanding retainers. This gives the improved electrical box of the invention the advantages of easier assembly and use.

It is also a feature of the improved electrical box of the invention to provide resiliently deflectable or deformable wedge elements which grip the electrical cable without having to be set. This gives the improved electrical box of the invention the advantage that the step of setting the clamps and all other cumbersome manipulations within the box are eliminated in utilization of the electrical box of the invention.

The improved electrical box of the invention further provides the feature that wedge elements are retained in the electrical box by retainers and the box walls. This reduces the risk of loss of wedges or clamps during shipment and provides the improved electrical box of the invention the advantage that special packaging or distribution is unnecessary.

The invention still further provides an improved electrical box which has the feature that wedge elements have upper portions and adjoining shoulders which are resiliently deflectable or deformable within a limited range by insertion of the electrical cable, so that upon insertion, the electrical cable is wedged between the upper portion and the box itself. This gives the improved electrical box of the invention the advantage that the electrical cable may be easily inserted as one step and with little risk of damage to the electrical cable.

The invention meets all of the above-described objects and provides all of the above features and advantages by providing an improved electrical box which includes an enclosure. The enclosure has a peripheral wall and a bottom. The peripheral wall has a first plurality of openings. The bottom has a second plurality of upstanding retainers adjacent the openings. A third plurality of wedge elements is disposed between the retainers and the peripheral wall adjacent the openings. The wedge elements are resiliently deflectable by insertion of electrical cables through the respective openings whereby insertion of the electrical cables wedges the electrical cables between the wedge elements and the peripheral wall.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
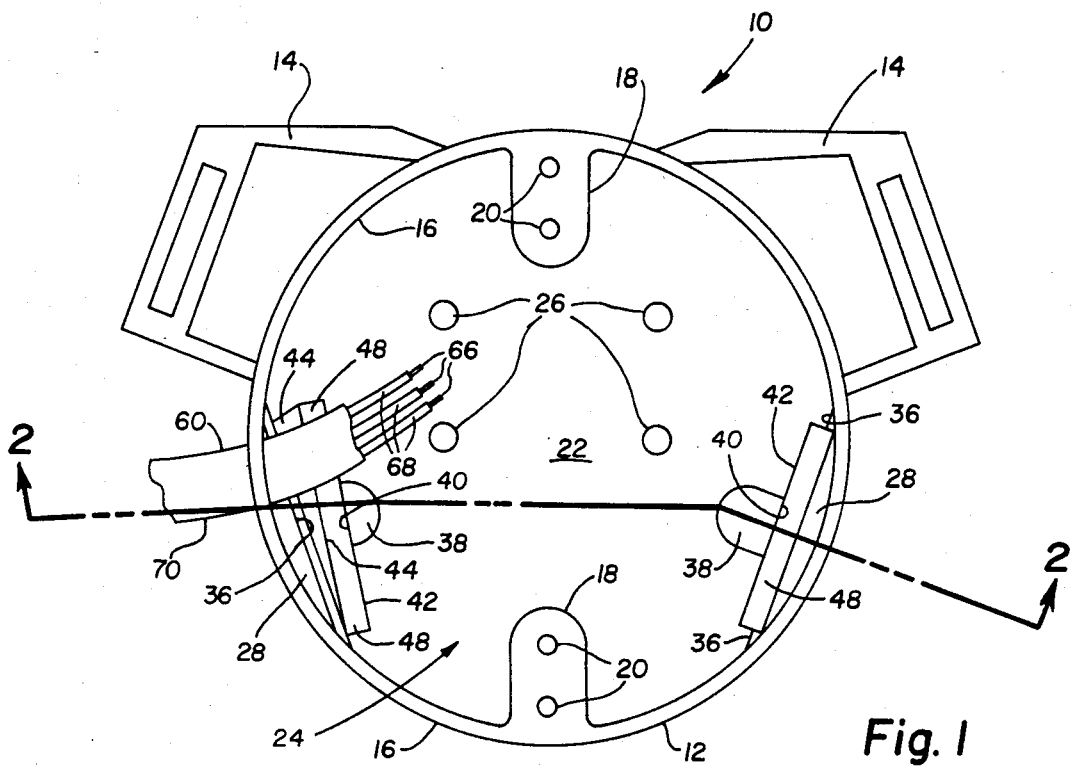
FIG. 1 is a top plan view of a specific embodiment of the improved electrical box of the invention.
Figure 2:
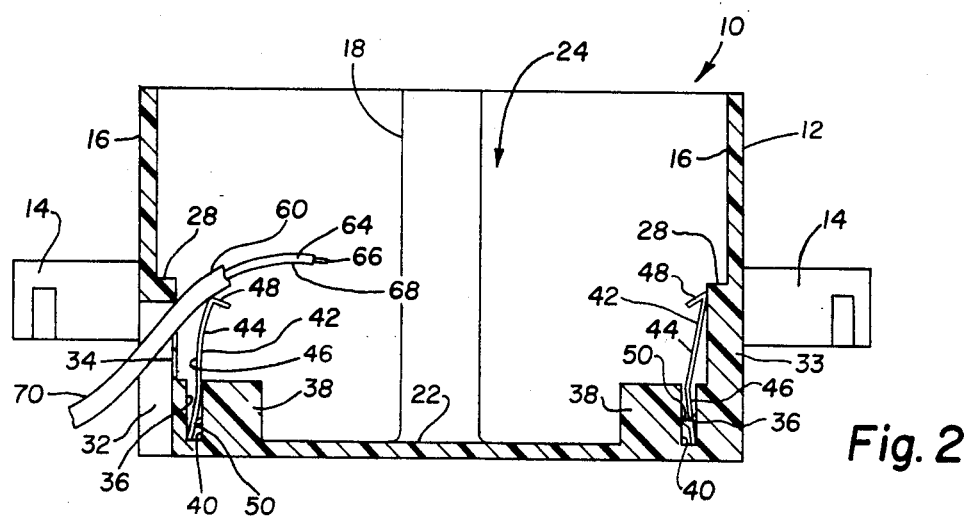
FIG. 2 is a cross-sectional view of the improved electrical box of the invention shown in FIG. 1 taken substantially along the Section Line 2—2 of FIG. 1.

The electrical box 10 of the invention has a nonmetallic enclosure 12 which meets the requirements of U.L. 514C 19.3 and 25 and NEC 370-7(C). The enclosure 12 is made of a conventional tough polymer and may be of whatever shape is desired such as the conventional cylindrical and rectangular shapes. In FIGS. 1 and 2, a cylindrical electrical box 10 is depicted. As shown in those figures, nail flanges 14 are attached to a peripheral wall 16 of the enclosure 12. Cover plate mounts 18 including screw holes 20 form a part of the peripheral wall 16 and are provided for attachment of a cover plate as required.

The enclosure 12 has a bottom 22 which, with the peripheral wall 16 defines a cavity 24. The bottom 22 may include screw holes 26 for mounting the electrical box to a stud or other building member.

The peripheral wall 16 has one or more casing sections 28. In a specific embodiment of the invention the casing sections are flattened or planar. With a cylindrical shaped enclosure 12 the casing sections 28 have the shape of chords in circular cross-sections of the enclosure 12.

The casing sections 28 each are shown to include a pair of window portions 32 separated by a divider 33. Within window portions 32 are openings 34. In a specific embodiment of the electrical box 10 of the invention, the window portions have "knock-out" openings in accordance with U.L. 514C 18.1-18.3. The openings or "knock-out" openings 34 are disposed in the peripheral wall 16 at a distance from the bottom 22.

Below the openings 34 is a sill wall 36. Sill wall 36 upstands from bottom 22. In a specific embodiment sill wall 36 is planar and parallel to the casing section 28.

The bottom 22 of the enclosure 12 has upstanding retainers 38 adjacent sill walls 36. The retainers 38 have upright surfaces 40 perpendicular to the bottom 22 of the enclosure 12. In the specific embodiment of FIGS. 1 and 2, each retainer 38 has one upright surface 40 facing and parallel to a respective sill wall 36. In another specific embodiment of the invention, each retainer 38 has three upright surfaces 40; one upright surface 40 facing sill wall 36 and two additional upright surfaces 40 adjoining the sides of the first upright surface 40 and extending away from sill wall 36.

Wedge elements 42 are positioned between the retainers 38 and the peripheral wall 16. The wedge elements 42 are made from a material, for example thin metal, which renders them resiliently deflectable or deformable. In a specific embodiment, the wedge elements 42 may be formed of 0.015 inch thick 1018 galvanized sheet steel. However, an equivalent material having the desired flexibility, resiliency and durability could also be used.

Each wedge element has one or more segments 54. Each segment has an upper portion 44 and a lower portion 46. Lower portion 46 is positioned between sill wall 36 and upright surface 40 and abuts the sill wall 36 at the base of sill wall 36 where it connects with bottom 22. Upper portion 44 adjoins lower portion 46 obtusely with upper and lower portions 44 and 46 being inclined toward casing section 28 and sill wall 36, respectively. In a specific embodiment of the invention, a dihedral angle of approximately 165° is defined between the upper portion 44 and lower portion 46 which faces in the direction of the adjacent peripheral wall 16 when an electrical cable 60 is not installed.

Shoulder 48 adjoins upper portion 44. In a specific embodiment, shoulder 48 extends in a direction down toward bottom 22 and away from adjacent peripheral wall 16, and defines with upper portion 44 an acute dihedral angle of about 60°.

Adjoining lower portion 46 is a restraining portion 50. Restraining portion 50 is bordered by legs 52 of lower portion 46. Restraining portion 50 extends upwardly from bottom 22 and defines an obtuse dihedral angle with lower portion 46 of about 90° or greater.

Restraining portion 50 has a gripping edge 62 which engages the upright surface 40 of the adjacent retainer 38, and has a shape complimentary to the shape of upright surface 40. The wedge elements 42 are kept in position in the enclosure 12 by their resiliency which provides for functional contact between the gripping edges 62 and the upright surfaces 40 and between the lower portions 46 and the sill walls 36.

In the embodiment in which the retainers 38 have three upright surfaces 40, wedge elements 42 may have both a central restraining portion 50, and a pair of side restraining portions disposed between the central portion 50 and the legs 52 of lower portion 46 to engage each of the upright surfaces 40, respectively. The side restraining portions in a specific embodiment may be longer than the central restraining portion and may extend outwardly of lower portion 46 at an angle of about 90°.

Upper portions 44, lower portions 46, shoulder 48 and restraining portions 50, in a specific embodiment, are each generally planar and adjoin each other along smooth bends. In a specific embodiment, wedge elements 42 can be made of sheet metal by cutting an appropriate piece and bending it smoothly to shape.

In the specific embodiment of FIGS. 1 and 2, a single retainer 38 is associated with a pair of openings 34 and a single wedge element 42 having a single segment 54 and a single upper portion 44 is shown to cover a pair of openings 34.

Figure 3:
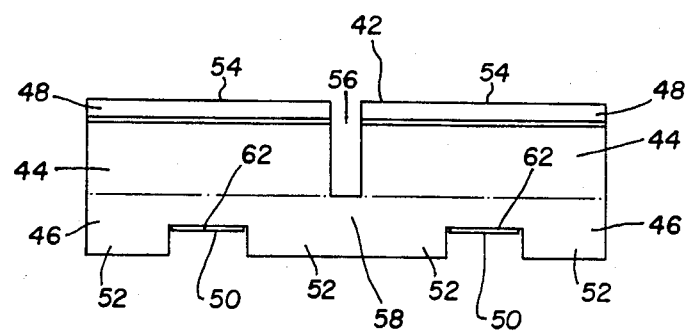
FIG. 3 is an inner plan view of the wedge element of another specific embodiment of the invention.

In the specific embodiment of FIG. 3, wedge element 42 is divided into a plurality of segments 54. Each segment will be associated with one or two openings 34 and a retainer 38. In this embodiment, segments 54 are separated from each other by a gap 56 between upper portion 44 and shoulders 48 and by a border portion 58 between lower portions 46.

The electrical box 10 of the invention is assembled upon manufacture by inserting the wedge elements 42 into the enclosure 12 and securing them between retainers 38 and sill walls 36 as shown. No further assembly steps are necessary. The electrical box may then be shipped.

The electrical box 10 of the invention, in a specific embodiment, is used by first "knocking out" openings 34 as desired. An electrical cable 60 can then be inserted through the selected openings 34 from the outside of box 10. The electrical cable 60 has a series of wires 64, each of which comprises an insulated conductor 66, enclosed by an exterior sheath 70. The insertion of the electrical cable 60 deforms or deflects the wedge element 42 away from casing section 28. Since the wedge elements 42 are resilient, the electrical cables 60 are gripped by the wedge elements 42 and wedged between an edge of the casing section 28 and the wedge elements 42. Insertion of a single electrical cable 60 through one of a pair of openings 34 deflects the wedge element 42 from a first position to a second position, in which that electrical cable 60 is wedged and the other opening 34 of the pair of openings 34 remains generally occluded by the wedge element 42. Insertion of a second electrical cable 60 through the other opening 34 of the pair of openings 34 deflects the wedge element 42 from the second position to a third position in which both electrical cables 60 are wedged by the wedge element 42. An undeflected wedge element 42 in the first position and a wedge element in the second position are illustrated in FIGS. 1 and 2.

In the undeflected first position, the upper portion 44, adjacent the shoulder 48, is in contact with or adjacent the casing section 28 of the peripheral wall 16 and the wedge element 42 generally covers both window portions 32. With one electrical cable 60 inserted, the upper portion 44 of the wedge element 42 adjacent the electrical cable 60 is displaced away from the casing section 28 of the peripheral wall 16 by the electrical cable 60 which abuts the casing section 28 of the peripheral wall 16 and the upper portion 44 of wedge element 42 adjacent the shoulder 48 such that the electrical cable 60 is wedged therebetween. Inherently, cable 60 urges edge element 42 against bottom 22.

In an embodiment of the invention, the act of inserting one or both electrical cables 60 into a pair of openings 34 of the enclosure 12 may move the respective upper portion 44 in excess of the displacement necessary to wedge the electrical cable or cables 60. Due to its resiliency, wedge element 42 deforms or deflects to move the respective upper portion 44 back to either the second position or third position depending on whether one or both electrical cables 60 are present, when the electrical cable 60 is released following insertion.

However, in order to prevent damage by overdeflection, in the specific embodiment illustrated, the range of movement of the upper portion 44 is restricted by abutting its respective retainer 38 at the bend between upper and lower portions 44, 46 when the wedge element 42 is deflected. This protects the wedge element from being damaged and insures that the upper portion 44 will be able to return to position after release of the electrical cable 60 by the user and remain functional.

While a specific embodiment of the invention has been shown and described herein for purposes of illustration, it is desired that the protection afforded by any patent which may issue upon this application not be limited strictly to the disclosed embodiment; but that it extend to all structures and arrangements which contain the essence of the invention and which fall fairly within the scope of the claims which are appended hereto.

What is claimed is:

1. An electrical box for use with one or more electrical cables, said electrical box comprising: an enclosure, said enclosure having a peripheral wall and a bottom, said peripheral wall having a plurality of cable openings, said bottom having a plurality of upstanding retainers adjacent said openings, a plurality of wedge elements, said wedge elements being disposed between said retainers and said peripheral wall generally covering said openings, said wedge elements each having an upper portion and a lower portion, said lower portion adjoining said upper portion, said lower portion inclining toward said bottom and said peripheral wall, said upper portion inclining away from said bottom and toward said peripheral wall each of said wedge elements being resiliently deflectable by the insertion of an electrical cable through a respective one of said cable openings, each of said wedge elements when deflected resiliently wedging the electrical cable between said wedge element and said peripheral wall.

2. The electrical box of claim 1 wherein said wedge elements resiliently wedge said cable in accordance with 1981 Standard UL 514C 25.

3. The electrical box of claim 1 wherein each of said wedge elements is disposed between said wall and a single retainer, said retainer generally covers a pair of said openings, each of said wedge elements being resiliently deflectable to a first position by insertion of a first electrical cable through one of said pair of openings wherein said wedge element resiliently wedges the electrical cable between said wedge element and said peripheral wall, each said wedge element being resiliently deflectable from said first position to a second position by the insertion of a second electrical cable through the other opening of said pair of openings, wherein said wedge element resiliently wedges both electrical cables between said wedge element and said peripheral wall.

4. The electrical box of claim 3 wherein said wedge elements each further comprise a plurality of segments, said segments each having an upper portion and a lower portion, each pair of segments having a border portion between said lower portions and a gap between said upper portions.

5. The electrical box of claim 1 wherein said wedge elements each have restraining portions adjoining said lower portions, said restraining portions engaging said retainers.

6. The electrical box of claim 5 wherein said upper portions and said lower portions and said restraining portions are each generally planar and adjoin along smooth bends.

7. The electrical box of claim 5 wherein said restraining portions have gripping edges generally contiguous with said retainers.

8. The electrical box of claim 7 wherein said retainers have upright surfaces, said upright surfaces being in cross-sections generally parallel to said bottom complimentary in shape to said gripping edges.

9. The electrical box of claim 8 wherein said upright surfaces are generally perpendicular to said bottom of said enclosure.

10. The electrical box of claim 8 wherein said said enclosure has sill walls disposed between said wedge elements and said peripheral wall, said upright surfaces of said retainers face and are generally parallel and adjacent to said sill walls.

11. The electrical box of claim 5 wherein said restraining portions incline upwardly away from said bottom.

12. The electrical box of claim 5 wherein said restraining portions of each of said wedge elements further comprise a pair of side restraining portions and a central restraining portion disposed between said side restraining portions, each of said restraining portions being shaped complementary to an upright surface of said retainers.

13. The electrical box of claim 1 wherein said enclosure has sill walls disposed between said wedge elements and said peripheral wall, said sill walls abutting said lower portions of said wedge elements.

14. The electrical box of claim 1 wherein said openings are generally covered by respective said upper portions of said wedge elements when said upper portions are not deflected.

15. The electrical box of claim 1 wherein said upper portions of said wedge elements abut said retainers respectively when said wedge elements are deflected.

16. The electrical box of claim 1 wherein the electrical cable will urge said wedge element against said bottom.

17. The electrical box of claim 1 wherein said retainers prevent said wedge elements from being damaged by excess deflection.

* * * * *